| NO. | MV 11 | BC 12 | BC 13 | BC 14 |
|---|---|---|---|---|
| 1 | 0 | 0 | 0 | 0 |
| 2 | 1 | 1 | 0 | 0 |
| 3 | 0 | 1 | 1 | 0 |
| 4 | 1 | 0 | 1 | 0 |
| 5 | 0 | 0 | 1 | 1 |
| 6 | 1 | 1 | 1 | 1 |
| 7 | 0 | 1 | 0 | 1 |
| 8 | 1 | 0 | 0 | 1 |

INVENTOR
CHARLES J. VAN HOUTEN

BY *William Grobman*

INVENTOR
CHARLES J. VAN HOUTEN
BY *William Grobman*
ATTORNEY

United States Patent Office 3,529,137
Patented Sept. 15, 1970

3,529,137
COUNTER SYSTEM
Charles J. Van Houten, San Mateo, Calif., assignor to Singer-General Precision, Inc., a corporation of Delaware
Filed Oct. 12, 1966, Ser. No. 586,235
Int. Cl. G06k; H04q; G06f 7/38; G06g 7/00
U.S. Cl. 235—92
6 Claims

ABSTRACT OF THE DISCLOSURE

The device is primarily useful in devices where the duration of the input pulses is comparatively long. A plurality of channels is provided, each channel having its own storage capacitor and associated transistor switching means. A clock drives a plurality of binary counters which are connected through a matrix to the outputs of the individual stages. An input pulse into any of the stages, whether or not that pulse occurs simultaneously with another pulse in another stage, charges the capacitor in its stage. When the entire system is scanned by means of the binary counters and matrix, each charged capacitor produces a separate and distinct output pulse. The scanning rate for the entire assembly is smaller than the time duration of any individual input pulse, and the various stages of assembly are scanned in sequence. The scanning and readout also returns each stage to its normal condition.

---

This invention relates to systems for counters, and, more particularly, to systems for indicating a random count over a period of time.

It is often desirable and necessary to count random events which occur at any time greater than a specified minimum interval of time. There are many situations where a device of this nature is used, but this specification will describe only one such situation, that of a plurality of vehicle counters all feeding the same register or totalizer. In such a device, there may be a large number of individual switching contacts, for example, each of which are closed whenever a vehicle approaches. Since the passages of the vehicles are random in time, any two pair of contacts are liable to be closed almost simultaneously. In the past, it has been difficult to obtain an accurate count of the total number of switch closures in such a system without the use of a large amount of equipment arranged in a complex manner.

It is an object of this invention to provide a new and improved counting system in which a plurality of events occurring at random intervals which may be extremely close in time are totalized, and an accurate output of the total is achieved.

It is another object of this invention to provide a new and improved system for indicating the total number of randomly occurring events from a plurality of individual sources.

It is a further object of this invention to provide a new and improved system which accurately produces the total number of individual counts from a plurality of separate sources during a prescribed interval of time by scanning a matrix.

Other objects and advantages of this invention will become apparent as the following description proceeds, which description should be considered together with the accompanying drawings in which.

Figures 1, 2:
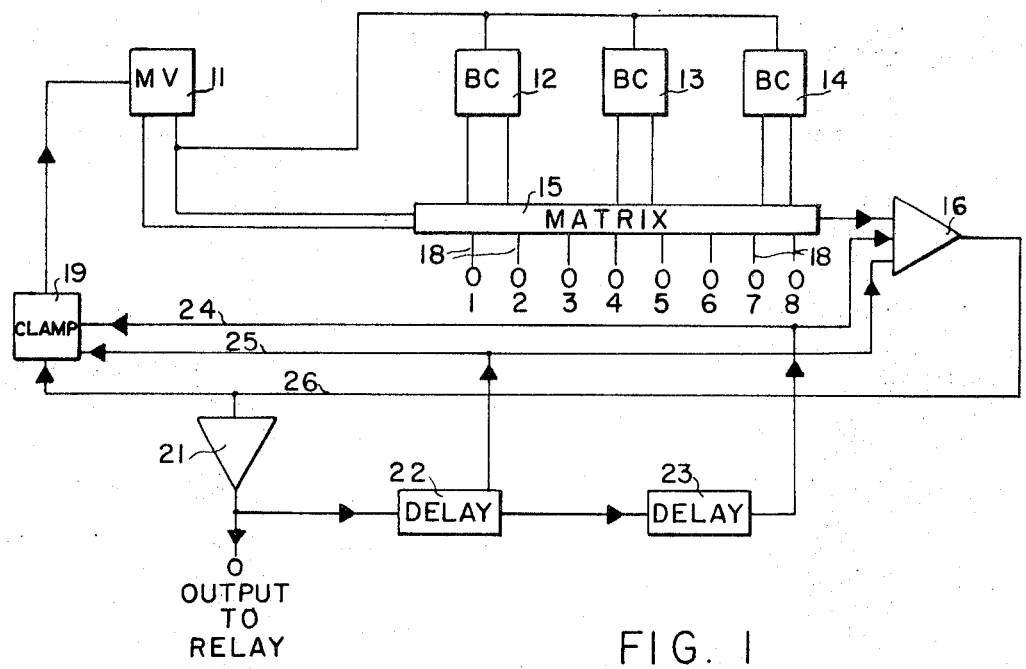
FIG. 1 is a block diagram of the system of this invention.
FIG. 2 is a table showing the connections of the matrix.

Referring now to the drawings in detail and more particularly to FIG. 1, the reference character 11 designates a clock such as a multivibrator to supply timed pulses.

Three binary counters 12, 13 and 14 are shown which, together with the clock 11, have their inputs connected to a matrix 15. Eight inputs 18 are shown connected to the matrix 15, and the output is applied to an amplifier 16 which is connected to the input of a relay driver 21 and to the input of a clamp 19. The output of the clamp 19 is connected to the clock 11 to stop the clock at prescribed times. The output from the relay driver 21 is connected to a relay, not shown, and also to the input of a first delay 22, the output of which is connected to the input of a second delay 23. One output from the delay 22 is connected to a line 25 which is connected to the input of both the amplifier 16 and the clamp 19. The output from the delay 23 is connected through a line 24 to the inputs of the clamp 19 and the amplifier 16.

The system shown in FIG. 1 in block form is a system by means of which the counts randomly registered by eight separate input counters are applied to a matrix 15 through lines 18. The total of all of the eight inputs is finally applied to a single register at the output of the matrix. As a pulse to be counted is applied from an individual line 18 to its circuit in the matrix 15, it is stored in the circuit 15 until that circuit is scanned by means of the outputs of the multivibrator 11 (clock) and the three binary counters 12, 13 and 14. Since the inputs from the individual counters are applied to the matrix 15 along separate lines 18, two such indications can occur simultaneously and still be recorded in the matrix 15. Thereafter, the matrix 15 is scanned in sequence during a prescribed time interval so that all of the counts registered in the matrix 15 are read out, each during its own time interval, and the results are applied to the amplifier 16. The output from the amplifier 16 is then a sequential arrangement of pulses which indicates the count stored by the matrix 15. Each time there is a pulse output from the amplifier 16, it is applied not only to the output amplifier 21 to drive a relay which may be connected to a mechanical register or any other similar indicating device, but it is also applied to the clamp 19 which serves to halt, temporarily, the operation of the multivibrator 11 so that for that instant the matrix 15 is frozen in its condition. In addition, a pair of delays 22 and 23 may be incorporated into the circuit. When an output occurs from the amplifier 21, it is applied to the input of the delay 22. After a prescribed period of time, the output from the delay 22 is applied to the line 25 to operate the clamp 19, and also to turn on the amplifier 16. At the end of the period of the first delay 22, the signal is passed to the second delay 23. Each of the two delays 22 and 23 may take the form of a monostable trigger circuit such as a one-shot multivibrator. During the interval of time that the delay 22 is in its unstable condition, it maintains the amplifier 16 on and operates the clamp 19 to halt the operation of the multivibrator 11. Similarly, during the time when the delay 23 is in its unstable condition, it applies a signal to the line 24 to close the amplifier 16 and to operate the clamp 19 which prevents the operation of the multivibrator 11. Turning the amplifier 16 off insures that the output relay is not operated during that period of time. This provides an adequate interval for stabilizing the circuits and to assure that there is sufficient space between subsequent operations of the relay. The multivibrator 11, in addition to supplying signals to the matrix 15, also serves as a clock to supply signals to the binary counters 12, 13 and 14 so that they are stepped through their counts at the same rate and so that the matrix 15 is scanned at a uniform rate and in the predetermined period of time. The scanning rate of the matrix 15 must be less than the minimum interval of time expected between pulse inputs on the lines 18. Thus, assuming that the lines 18 are supplied by vehicles, and that the minimum interval of time which can be expected between the pulses on any one line is substantially greater than the scanning rate of the matrix 15, all of the counts supplied to the matrix will be counted. Even if two vehicles are detected simultaneously, their indications are supplied to the matrix 15 along different lines 18 and they are therefore recorded. The matrix 15 is then scanned at a very high rate. In fact, the scanning rate of the matrix 15 should be high enough so that the matrix 15 can be completely scanned in a time which is less than that required by any one input pulse on line 18 to decay.

The problem encountered in an apparatus of this type is that of complexity. The more complex a system is the more expensive it is to build and to maintain and the less reliable it becomes. Normally, a system of the type illustrated in FIG. 1 would require that the apparatus be able to scan the matrix, be able to determine whether or not there has been a change in the condition of each point from the last time it was scanned and the driection of that change, and to develop an output which is indicative of that change. A standard way of doing this would require one flip-flop per point being scanned to store the last condition of that point, an input gate to step the binary counters, and set and reset gates. In an arrangement of this type, each point being scanned would require a minimum of five transistors. This invention provides a reliable, operative circuit which utilizes only two transistors per point.

Figure 3:
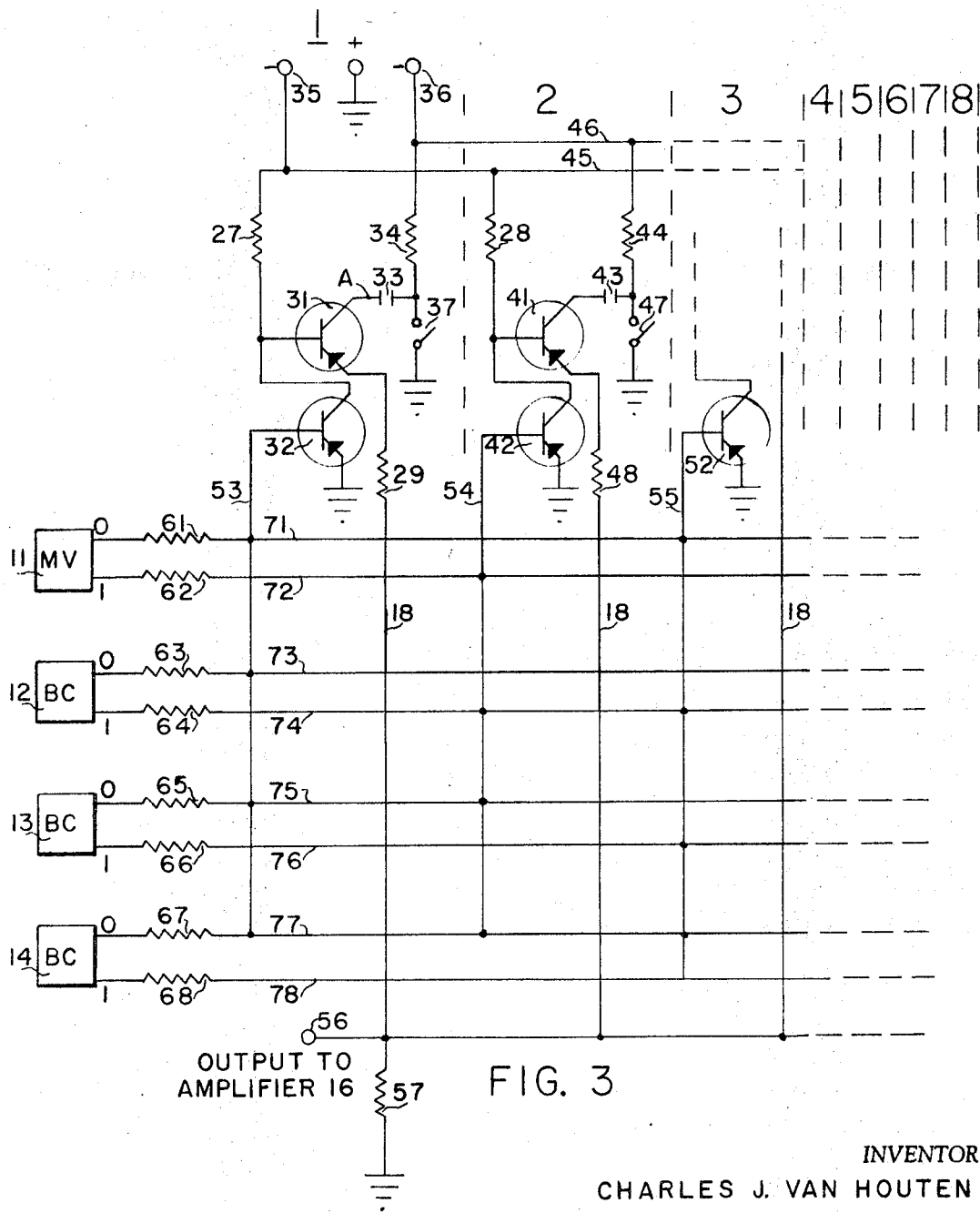
FIG. 3 is a schematic wiring diagram of a portion of the system of this invention.

The apparatus shown in FIG. 3 is only a portion of the entire matrix, the rest of the matrix being duplicates of that shown. Dashed lines divide the matrix into the individual circuits for each of the eight separate scanning points. These sections are appropriately labled at the top. Complete circuitry for only the first two of these scanning points is shown. Section 1 comprises a first transistor 31 having a base electrode, an emitter electrode and a collector electrode. The base electrode of the transistor 31 is connected through a resistor 27 to the negative terminal 35 of a source of electrical energy, the positive side of which is grounded. The emitter electrode of the transistor 31 is connected through a resistor 29 to the output terminal through the line 18. The collector electrode of the transistor 31 is connected to one side of a capacitor 33, the other side of which is connected through a resistor 34 to the negative terminal 36 of a source of biasing potential. A switch 37 also connects the junction of the capacitor 33 and the resistor 34 to ground. A second transistor 32 having a base electrode, an emitter electrode and a collector electrode has its emitter electrode grounded and its collector electrode connected through the resistor 27 to the negative terminal 35. The base electrode of the transistor 32 is connected to a line 53 of the matrix 15. Also shown in FIG. 3 are the multivibrator 11, the binary counter 12, the binary counter 13 and the binary counter 14. Each of the multivibrator 11 and the binary counters 12–14 are shown with its two outputs labeled zero and one. The zero output from the multivibrator 11 is connected to the matrix 15 through a resistor 61 and the one output from the multivibrator 11 is connected into the matrix through a resistor 62. Similarly, the zero output from the binary counter 12 is connected through resistor 63 and the one output of the binary counter 12 is connected through a resistor 64, both to the matrix 15. The binary counter 13 has its zero output connected through a resistor 65 and its one output connected through a resistor 66, while the binary counter 14 has its zero output connected through a resistor 67 and its one output connected through a resistor 68 to the input of the matrix 15. Of course, the transistors shown in FIG. 2 are only exemplary, and any other suitable electric control or switching devices may be used.

The manner in which the multivibrator 11 and the binary counters 12, 13 and 14 are connected to the various sections of the matrix 15 is shown in the table of FIG. 2. From the table of FIG. 2 it can be seen that section number 1 is connected to the zero output from the multivibrator 11 and the zero outputs from each of the binary counters 12, 13 and 14. Section number 2 is connected to the one output of the multivibrator 11 and to the one output of the binary counter 12, as well as to the zero outputs of the binary counters 13 and 14. Section number 3 is connected to the zero outputs of the multivibrator 11 and of the binary counter 14 and to the one outputs of the binary counters 12 and 13. From this the remainder of the sections of the matrix connections can be determined from the table of FIG. 2. Referring again to FIG. 3, the line 53 which connects the outputs from the multivibrator 11 and the binary counters 12, 13 and 14 to section 1 of the matrix 15 is shown connected to the zero outputs of the multivibrator 11 and of each of the binary counters 12, 13 and 14. The switches 37, 47, etc., in the circuit of the collector electrodes of the transistors 31, 41, etc., represent input devices which apply to the matrix 15 the equivalent of a zero when the switch is open and the equivalent of a one when the switch is closed.

In normal operation, the bias potential applied to terminal 36 is approximately one-half the value of that applied to the terminal 35. In addition, the potential at point A, which is the potential of the collector electrode of the transistor 31, is also approximately one-half of the potential applied at terminal 35. This is with transistor 32 non-conductive. The potential at this point is determined by the potential drop produced by the conduction through resistor 27, transistor 31, resistor 29 and resistor 57. So long as the switch 37 remains in its open condition, as shown, the capacitor 33 charges to the value of point A. While the two transistors 31 and 32 are non-conducting, leakage through transistors 31 will tend to discharge the capacitor 33, so that the capacitor should be sufficiently large that during the time between scans the total leakage therefrom is quite small. Each time that the matrix 15 is scanned, the charge on the capacitor 33 is restored by conduction through the base collector circuit of transistor 31 and conduction through transistor 32. When, however, switch 37 is closed (switch 37, by the way, is the equivalent in FIG. 3 of a traffic counter or control switch mentioned above in connection with the description of FIG. 1), then the capacitor 33 is grounded and discharges so that the voltage drop across the capacitor 33 is approximately zero. The switch 37 remains closed only long enough to discharge the capacitor 35. This situation prevails until the matrix 15 is scanned, and when the connections are made to line 53, and transistor 32 conducts, the potential of line 53 does not immediately rise to the potential of point A, but, instead, remains low until capacitor 33 is recharged. The conduction to charge capacitor 33 takes place through the emitter-collector circuit of the transistor 31, and the current flow through that transistor produces a positive-going potential across the resistor 57.

Thus, whenever the switch 37 is closed between subsequent scans of the matrix 15, an indication of that closure is stored by the reduced charge on the capacitor 33. This information remains stored in the matrix 15 until the next scan, at which time the matrix is read and a corresponding output train is developed. The remaining seven sections of the matrix all operate the same as section 1 which was described. Section 2 of the matrix is shown to be identical to that of section 1 except for the matrix connections to the multivibrator 11 and the binary counters 12 through 14. Thus, even though two switches, such as 37 and 47, are closed by vehicles at the same time, each closure is counted when the matrix 15 is scanned.

Also in FIG. 3 the connections of three of the sections with the multivibrator 11 and the binary counters 12 through 14 are shown to indicate how each section of the matrix is read individually. Thus, line 53 which connects the transistor 32 of section 1 to the scanning and reading device is shown connected to the zero output terminals of the multivibrator 11 and also three binary counters. Line 54 which is connected to the base electrode of the transistor 42 of section 2 is connected to the one output terminals of the multivibrator 11 and of the binary counters 12 and to the zero output terminals of the binary counters 13 and 14. Similarly, line 55 from the base electrode of transistor 52 of section 3 is connected to the zero output terminals of the multivibrator 11 and the binary counter 14 and to the one output terminals of the binary counters 12 and 13. The connections of the scanning lines of the matrix 15 to the multivibrator 11 and the binary counters 12 through 14 follow the pattern laid out in the table of FIG. 2 so that as the multivibrator 11 causes the individual binary counters to change their conditions and count up scale, only one section of the matrix 15 is read at any time. Since the reading of the several sections of the matrix 15 follow one-after-the-other, there is developed across output resistor 57 at the terminal 56, to be applied to the amplifier 16, a train of pulses in serial form which is applied to the output to be indicated by the operation of a relay or other similar indicating device such as a mechanical register.

In addition, the system shown in FIG. 1 can be modified so that every tenth count or twentieth count or other similar multiple of counts may be caused to actuate the relay rather than have it respond to each count. However, primarily, the system of this invention provides a simple structure which is reliable to count each of a number of events which may occur during a prescribed interval of time. The device of this invention operates to count each event even though several events may occur in parallel in the same time. It is realized that the above specification may indicate to those skilled in the art other ways in which the principles of this invention may be used without departing from its spirit. It is, therefore, intended that the above invention shall be limited only by the scope of the appended claims.

What is claimed is:

1. Apparatus for counting the number of specified events which occur during a prescribed interval of time regardless of whether the events occur serially or simultaneously, said apparatus comprising a signal storage device for each item being monitored, means for establishing a standard condition in said storage device and maintaining that condition during the time that no event occurs, means for modifying the condition of said storage device whenever an event associated with that storage device occurs, said modifying means comprising plurality of operators, means for receiving from each of a plurality of separate operators a signal to indicate when the operator has operated, means for applying said signals to the individual storage device associated with the operated operator, a matrix arranged to read each of said storage devices in sequence, a clock for generating pulses which step said reading means in sequence, means on the output of said apparatus for creating an electrical pulse each time a storage device is read with a changed condition, means for interrupting the generation of said pulses when said storage devices are not being read, said storage devices comprising capacitors, one capacitor being provided for each operator, means for connecting a source of electrical energy across said capacitors to charge said capacitors, and means connected to each of said capacitors for discharging individual ones of said capacitors when its associated operator is operated.

2. The apparatus defined in claim 1 wherein said means for connecting a source of electrical energy across said capacitors includes a first electric control device connected between each capacitor and said source of electrical energy.

3. The apparatus defined in claim 2 wherein said matrix includes a plurality of binary counters connected to said matrix, and an output circuit, said matrix being connected to the outputs of said counters and said clock to cause each of said capacitors ot be connected to said output circuit as said binary counters are stepped into different counts.

4. The apparatus defined in claim 3 further including a second electric control device for each capacitor, said second control device being connected to said first control device and to a unique combination of outputs from said binary counters so that when said unique combination is achieved, said second control device conducts to cause said first control device to conduct and to read the condition of its associated capacitor.

5. The apparatus defined in claim 4 wherein said output circuit includes a common load device for all of said first control devices, and means connected to said load for taking a single output from said circuit.

6. The apparatus defined in claim 5 wherein the frequency of operation of said clock controls the time required to step the binary counters through their sequence of counts, the time for the complete sequence of counts of said binary counters being substantially shorter than the time required for each event to occur.

References Cited

UNITED STATES PATENTS

| | | | |
|---|---|---|---|
| 2,811,713 | 10/1957 | Spencer | 340—347 |
| 2,964,657 | 12/1960 | Page | 235—92 |
| 2,993,196 | 7/1961 | Hughes et al. | 340—174 |
| 3,119,950 | 1/1964 | Somlyody | 235—92 |
| 3,181,129 | 4/1965 | Freedman | 340—174 |
| 3,350,547 | 10/1967 | Brockett | 235—92 |
| 3,370,158 | 2/1968 | Lehmer | 235—92 |

DARYL W. COOK, Primary Examiner

R. M. KILGORE, Assistant Examiner

U.S. Cl. X.R.

235—61.6; 340—168